United States Patent [19]
Goto

[11] 4,258,981
[45] Mar. 31, 1981

[54] REPRODUCING OBJECTIVE FOR VIDEO DISKS

[75] Inventor: Atsuo Goto, Tachikawa, Japan

[73] Assignee: Olympus Optical Co., Ltd., Tokyo, Japan

[21] Appl. No.: 87,069

[22] Filed: Oct. 22, 1979

[30] Foreign Application Priority Data

Nov. 9, 1977 [JP] Japan .................... 52/133537

[51] Int. Cl.³ .............................................. G02B 9/16
[52] U.S. Cl. ...................................... 350/475; 350/414
[58] Field of Search ................... 350/226, 175 ML

[56] References Cited
FOREIGN PATENT DOCUMENTS
45-39432 12/1970 Japan ........................... 350/226

*Primary Examiner*—Paul A. Sacher
*Attorney, Agent, or Firm*—Cushman, Darby & Cushman

[57] ABSTRACT

A reproducing objective for video disks comprising a first, second and third lenses in which the first lens is a biconvex lens, the second lens is a negative meniscus lens, and the third lens is a positive meniscus lens, the reproducing objective for video disks being compact in size and light in weight and having a long working distance.

4 Claims, 4 Drawing Figures

REPRODUCING OBJECTIVE FOR VIDEO DISKS

BACKGROUND OF THE INVENTION (a) Field of the Invention

The present invention relates to an objective for video disks and, more particularly, to an objective for reading out the signals recorded on high-density information-recording disks (video disks).

(b) Description of the Prior Art

For objectives to be used in reproducing systems for video disks, it is required to warrant resolving power of 1μ due to the fact that the objective has to read out very small signals recorded with high density. Moreover, the information read out from the disk, which rotates at high speed, contains signals for making the objective follow up the recorded track and signals for automatic focusing in addition to image information. To make the objective read out those information and signals correctly, the flatness of image focused by the objective should be high. To prevent breakage of the video disk and objective which will be caused when the objective contacts the video disk, the working distance of the objective should be long. Besides, to perform automatic focusing, the objective should be compact and light in weight. Moreover, the price of the objective should be low.

As the light used for the objective for video disks is generally a monochromatic light (λ=6328 Å), it is effective for eliminating the noise at the time of amplifying the signals from a detector when transparency for the light of this wavelength is as high as possible. Therefore, to make transparency high, it is necessary to provide multi-layer anti-reflection coating on the lens surface or to make the number of lenses constituting the objective as small as possible. When this problem is considered in connection with the above-mentioned other requirements such as low price and light weight, it is more advantageous when the number of lenses constituting the objective is made as small as possible.

Some of known reproducing objectives for video disks are designed by taking the above-mentioned points into consideration. Generally, however, most of such objectives are arranged by modifying microscope objectives. An example of such objectives for video disks is the objective according to Japanese Published Unexamined Patent Application No. 124660/75. In case of the above-mentioned objective, a hemispherical lens is used as the first lens component and a cemented doublet is used as the third lens component. Therefore, the weight of the objective cannot be made light enough and working distance is comparatively small. Moreover, the above-mentioned objective is not advantageous for cost reduction because of the shape of the hemispherical lens is not suitable for mass production and the third lens component has a cemented surface.

SUMMARY OF THE INVENTION

It is, therefore, a primary object of the present invention to provide a reproducing objective for video disks for which the lens configuration is very simple, the weight is very light, resolving power is high, and working distance (W.D.) is long. The reproducing objective for video disks according to the present invention has the lens configuration as shown in FIG. 1. It comprises three single lenses, i.e., a first, second and third lenses in the order from the information detector side to the information side. The first lens is a biconvex lens, the second lens is a negative meniscus lens arranged concave toward the first lens side, and the third lens is a positive meniscus lens arranged convex toward the second lens side. Besides, the objective according to the present invention satisfies the following conditions when reference symbol $r_3$ represents the radius of curvature of the surface of the first lens side of the second lens, reference symbol $r_5$ represents the radius of curvature of the surface on the second lens side of the third lens, reference symbol $d_4$ represents the airspace between the second and third lenses, reference symbol $d_5$ represents the thickness of the third lens, and reference symbol $f_1$ represents the focal length of the first lens, reference symbol $f_3$ represents the focal length of the third lens, and reference symbol $f$ represent the focal length of the lens system as a whole.

(1) $-1.65f < r_3 < -1.00f$
(2) $0.42f < r_5 < 0.56f$
(3) $f_3 < 0.8f$
(4) $0.7f < d_4 < 1.0f$
(5) $1.4f < f_1 < 1.7f$
(6) $0.1f < d_5 < 0.19f$

The upper and lower limits of the above-mentioned conditions for the objective according to the present invention are given due to the following reasons.

To obtain a lens system having high resolving power, it is necessary to eliminate spherical aberration satisfactorily. The condition (1) is established for the purpose of correcting the spherical aberration caused by the first lens. If $r_3$ becomes larger than the upper limit of the condition (1), the residual spherical aberration at the intermediate N.A. becomes large. If it is attempted to correct such residual spherical aberration, the overall length of the lens system becomes large and it is disadvantageous for obtaining a light-weight objective. If $r_3$ becomes smaller than the lower limit, the correcting effect of the surface $r_3$ for spherical aberration becomes weak and, consequently, the radius of curvature of the concave surface of the third lens component should be made small. In that case, however, the effective working distance becomes small. To make the spherical aberration small, it is effective to use materials with high refractive indices for the first and third lenses.

The condition (2) is established for the purpose of correcting astigmatism, i.e., astigmatism caused by the first and sixth surfaces. If $r_5$ becomes larger than the upper limit of the condition (2), astigmatism will be overcorrected. If $r_5$ becomes smaller than the lower limit, astigmatism will be undercorrected.

The condition (3) is established for the purpose of keeping the working distance satisfactorily large. If $f_3$ in the condition (3) becomes larger than 0.8f, the working distance becomes small and it becomes inconvenient for using the lens system as an objective for video disks.

Besides, it is possible to make Petzval's sum small and to thereby make curvature of field also small when the refractive indices of the first and third lenses are made high, i.e., 1.70 or more, and refractive index of the second lens is made low, i.e., 1.55 or less, in addition to the above-mentioned conditions.

If $d_4$ becomes smaller than the lower limit of the condition (4), it becomes difficult to correct astigmatism favourably. If $d_4$ becomes larger than the upper limit, the working distance becomes small. If it is attempted to make the working distance large in that case, spherical aberration becomes unfavourable.

The focal length of the third lens is defined by the condition (3) and the airspace between the second and third lenses is defined by the condition (4). Consequently, the total focal length of the first and second lenses is thereby decided approximately. When, in the above state, the focal length $f_1$ of the first lens is selected within the range defined by the condition (5), it is possible to correct spherical aberration more favourably in combination with the condition (3). If, in the condition (5), $f_1$ becomes smaller than the lower limit, spherical aberration to be caused by the first lens becomes large and it becomes impossible to correct it by the surface $r_3$. If $f_1$ becomes larger than the upper limit, the residual spherical aberration becomes large.

The condition (6) is to define the thickness of the third lens. By selecting $d_5$ within the range defined by this condition, the third lens is made thin and small in diameter. As it is possible to thereby make the third lens small and light, it is possible to make the lens system as a whole more compact and lighter.

DETAILED DESCRIPTION OF THE PREFERRED EMBODIMENTS

Preferred embodiments of the reproducing objective for video disks according to the present invention explained in the above are as shown below.

Embodiment 1

$r_1 = 1.7571$
  $d_1 = 0.294$    $n_1 = 1.77861$    $\nu_1 = 25.7$
$r_2 = -2.9694$
  $d_2 = 0.129$
$r_3 = -1.2488$
  $d_3 = 0.235$    $n_2 = 1.51462$    $\nu_2 = 64.2$
$r_4 = -2.6100$
  $d_4 = 0.848$
$r_5 = 0.5044$
  $d_5 = 0.118$    $n_3 = 1.77861$    $\nu_3 = 25.7$
$r_6 = 3.9556$
  $f = 1$    N.A. $= 0.4$    W.D. $= 0.259$
  $\beta = -0.05X$    $f_3 = 0.7318$    $f_1 = 1.458$ Embodiment 2

$r_1 = 1.3306$
  $d_1 = 0.232$    $n_1 = 1.77861$    $\nu_1 = 25.7$
$r_2 = -8.0103$
  $d_2 = 0.131$
$r_3 = -1.6152$
  $d_3 = 0.335$    $n_2 = 1.51462$    $\nu_2 = 64.2$
$r_4 = -3.5690$
  $d_4 = 0.751$
$r_5 = 0.4414$
  $d_5 = 0.119$    $n_3 = 1.77861$    $\nu_3 = 25.7$
$r_6 = 1.4929$
  $f = 1$    N.A. $= 0.4$    W.D. $= 0.245$
  $\beta = -0.05X$    $f_3 = 0.7672$    $f_1 = 1.483$ Embodiment 3

Figure 1:
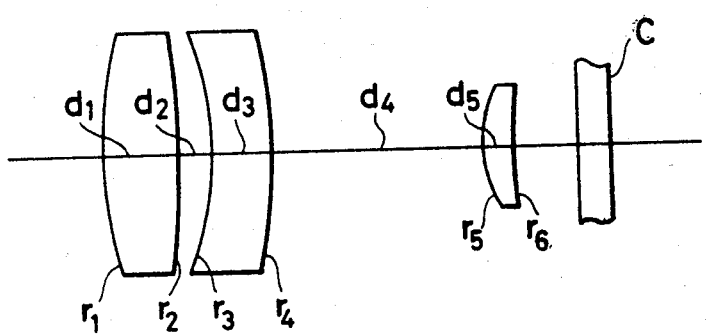
FIG. 1 shows a sectional view of the reproducing objective for video disks according to the present invention.
Figure 2:
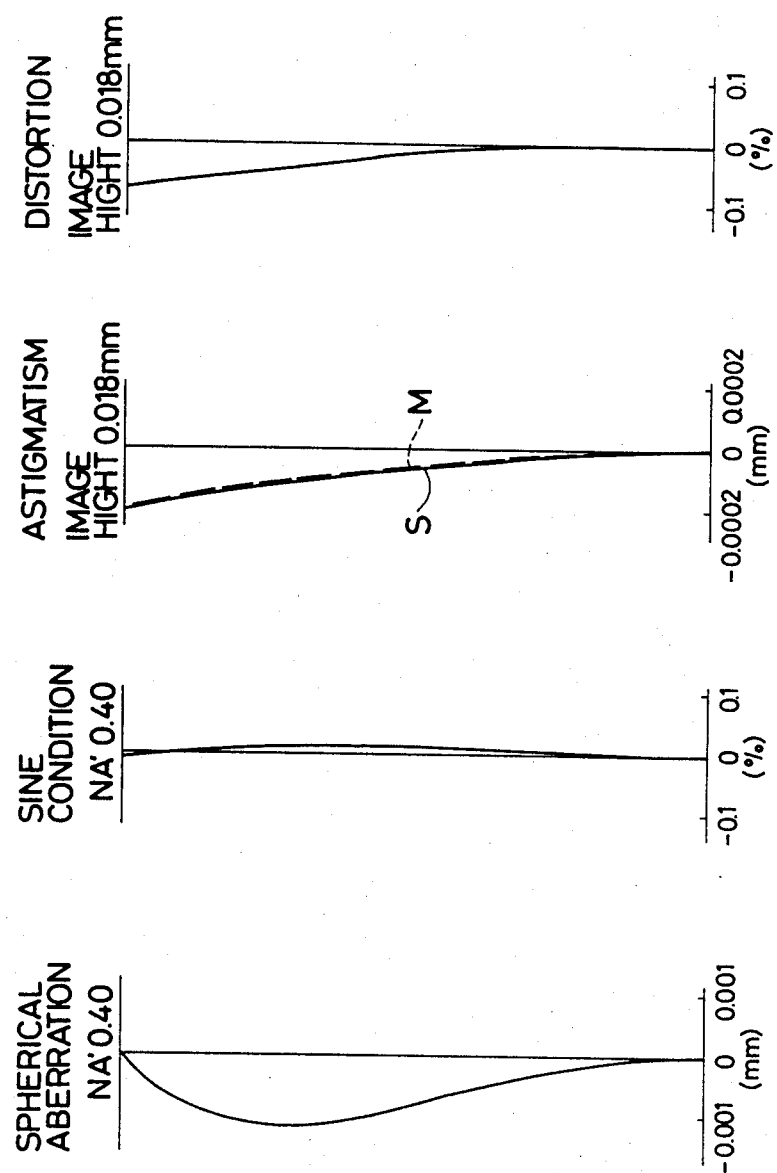
FIG. 2 shows graphs illustrating aberration curves of Embodiment 1 of the present invention.
Figure 3:
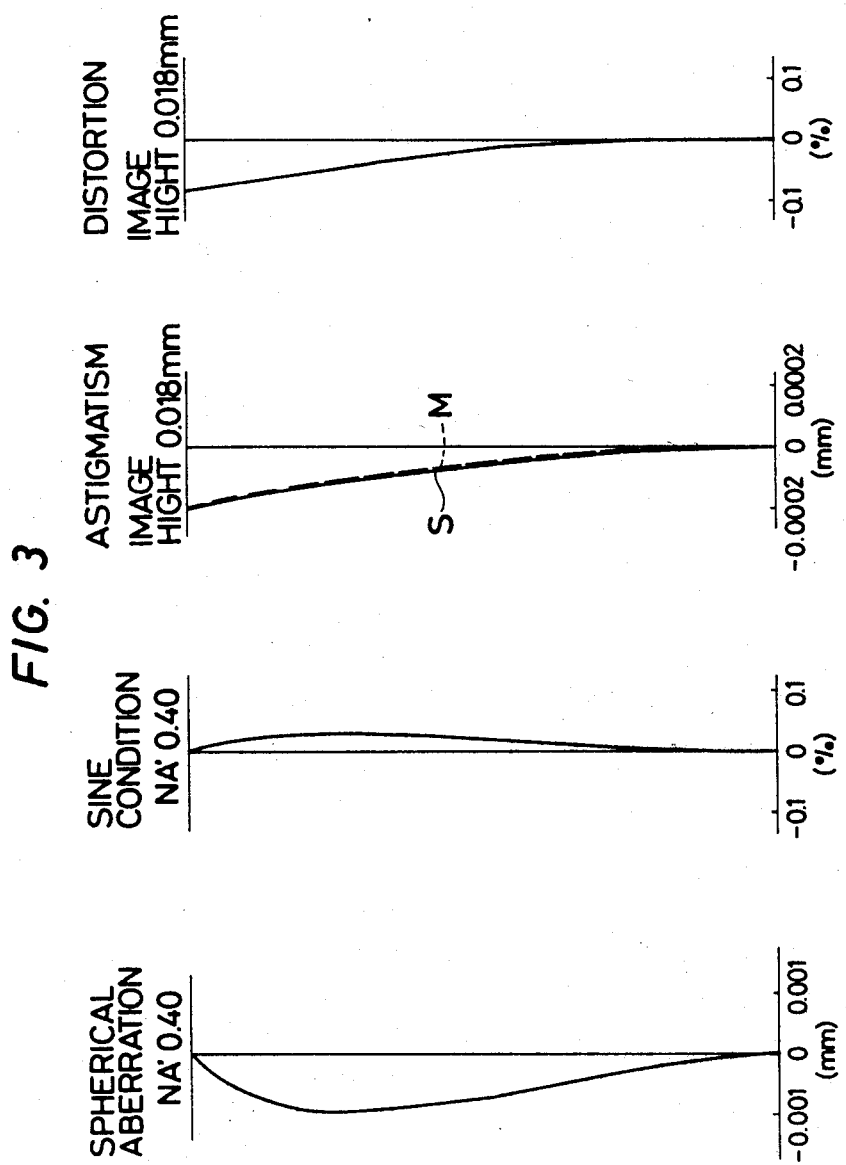
FIG. 3 shows graphs illustrating aberration curves of Embodiment 2.
Figure 4:
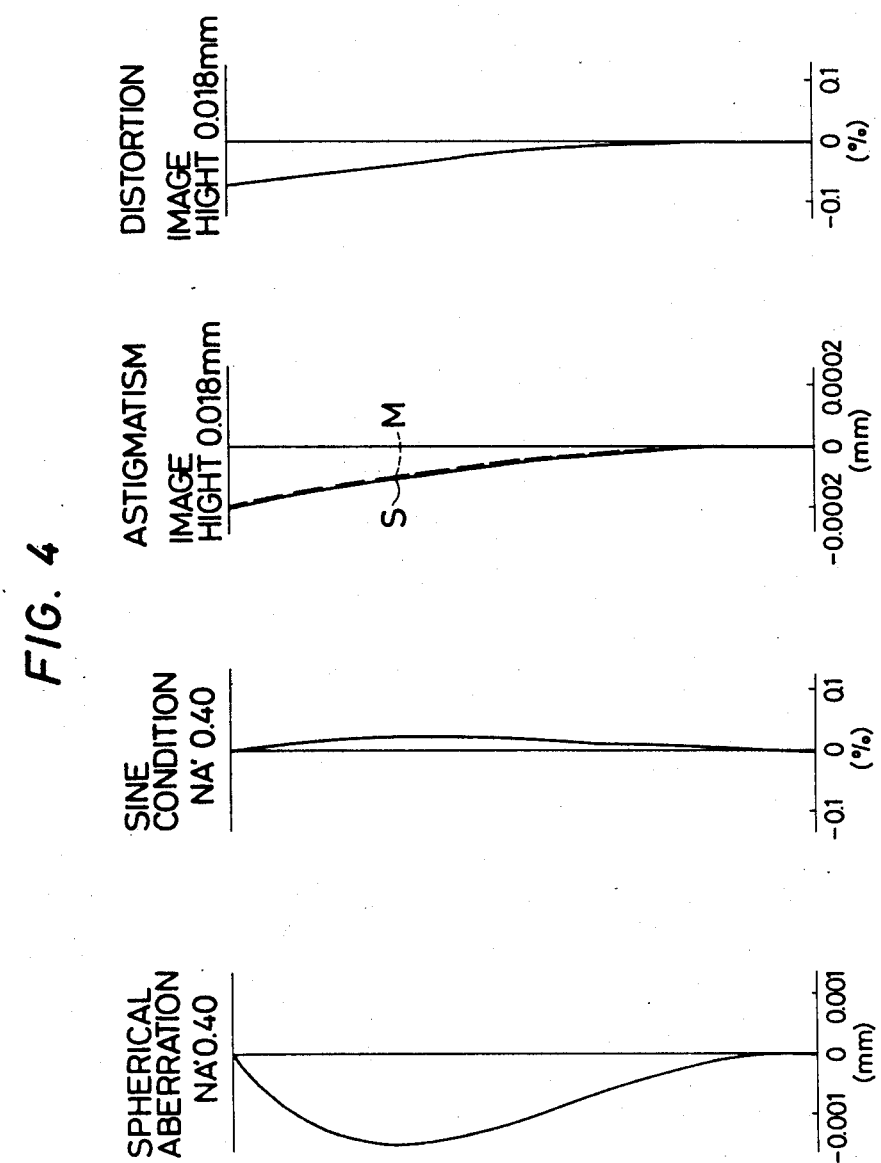
FIG. 4 shows graphs illustrating aberration curves of Embodiment 3.

$r_1 = 2.6586$
  $d_1 = 0.377$    $n_1 = 1.77861$    $\nu_1 = 25.7$
$r_2 = -2.4267$
  $d_2 = 0.129$
$r_3 = -1.0082$
  $d_3 = 0.274$    $n_2 = 1.51462$    $\nu_2 = 64.2$
$r_4 = -1.3662$
  $d_4 = 0.923$
$r_5 = 0.5442$
  $d_5 = 0.183$    $n_3 = 1.77861$    $\nu_3 = 25.7$
$r_6 = 5.2755$
  $f = 1$    N.A. $= 0.4$    W.D. $= 0.259$
  $\beta = -0.05X$    $f_3 = 0.7667$    $f_1 = 1.683$ In the above embodiments, reference symbols $r_1$ through $r_6$ respectively represent radii of curvature of respective lens surface, reference symbols $d_1$ through $d_5$ respectively represent thicknesses of respective lenses and airspaces between respective lenses, reference symbols $n_1$, $n_2$ and $n_3$ respectively represent refractive indices of respective lenses at $\lambda = 632.8$ nm, reference symbols $\nu_1$, $\nu_2$ and $\nu_3$ respectively represent Abbe's numbers of respective lenses for d-line, reference symbol f represents the focal length of the lens system as a whole, reference symbols $f_1$ and $f_3$ respectively represents focal lengths of the first and third lenses, reference symbol N.A. represents the numerical aperture, reference symbol W.D. represents the working distance, and reference symbol $\beta$ represents magnification. Besides, reference symbol C in FIG. 1 represents a cover glass arranged in front of the recorded disk.

I claim:

1. A reproducing objective for video disks comprising a first, second and third lenses, said first lens being a biconvex lens, said second lens being a negative meniscus lens, said third lens being a positive meniscus lens, said reproducing objective for video disks satisfying the following conditions:

(1) $-1.65f < r_3 < -1.00f$
(2) $0.42f < r_5 < 0.56f$
(3) $f_3 < 0.8f$
(4) $0.7f < d_4 < 1.0f$
(5) $1.4f < f_1 < 1.7f$
(6) $0.1f < d_5 < 0.19f$ wherein reference symbol $r_3$ represents the radius of curvature of the surface on the first lens side of the second lens, reference symbol $r_5$ represents the radius of curvature of the surface on the second lens side of the third lens, reference symbol $d_4$ represents the airspace between the second and third lenses, reference symbol $d_5$ represents the thickness of the third lens, reference symbol $f_1$ represents the focal length of the first lens, reference symbol $f_3$ represents the focal length of the third lens, and reference symbol f represents the focal length of the lens system as a whole.

2. A reproducing objective for video disks according to claim 1, in which said reproducing objective for video disks has the following numerical data:

$r_1 = 1.7571$
  $d_1 = 0.294$    $n_1 = 1.77861$    $\nu_1 = 25.7$
$r_2 = -2.9694$
  $d_2 = 0.129$
$r_3 = -1.2488$
  $d_3 = 0.235$    $n_2 = 1.51462$    $\nu_2 = 64.2$
$r_4 = -2.6100$
  $d_4 = 0.848$
$r_5 = 0.5044$

-continued

|  |  |  |
|---|---|---|
| $d_5 = 0.118$ | $n_3 = 1.77861$ | $\nu_3 = 25.7$ |

$r_6 = 3.9556$ $f = 1 \quad N.A. = 0.4 \quad W.D. = 0.259$
$\beta = -0.05X \quad f_3 = 0.7318 \quad f_1 = 1.458$ wherein reference symbols $r_1$ through $r_6$ respectively represent radii of curvature of respective lens surfaces, reference symbols $d_1$ through $d_5$ respectively represent thicknesses of respective lenses and airspaces between respective lenses, reference symbols $n_1$, $n_2$ and $n_3$ respectively represent refractive indices of respective lenses at $\lambda = 632.8$ nm, reference symbols $\nu_1$, $\nu_2$ and $\nu_3$ respectively represent Abbe's numbers of respective lenses for d-line, reference symbol f represents the focal length of the lens system as a whole, reference symbols $f_1$ and $f_3$ respectively represents focal lengths of the first and third lenses, reference symbol N.A. represents the numerical aperture, reference symbol W.D. represents the working distance, and reference symbol $\beta$ represents magnification.

3. A reproducing objective for video disks according to claim 1, in which said reproducing objective for video disks has the following numerical data:

$r_1 = 1.3306$

|  |  |  |
|---|---|---|
| $d_1 = 0.232$ | $n_1 = 1.77861$ | $\nu_1 = 25.7$ |

$r_2 = -8.0103$ $d_2 = 0.131$ $r_3 = -1.6152$

|  |  |  |
|---|---|---|
| $d_3 = 0.335$ | $n_2 = 1.51462$ | $\nu_2 = 64.2$ |

$r_4 = -3.5690$ $d_4 = 0.751$ $r_5 = 0.4414$

|  |  |  |
|---|---|---|
| $d_5 = 0.119$ | $n_3 = 1.77861$ | $\nu_3 = 25.7$ |

$r_6 = 1.4929$ $f = 1 \quad N.A. = 0.4 \quad W.D. = 0.245$
$\beta = -0.05X \quad f_3 = 0.7672 \quad f_1 = 1.483$ wherein reference symbols $r_1$ through $r_6$ respectively represent radii of curvature of respective lens surfaces, reference symbols $d_1$ through $d_5$ respectively represent thicknesses of respective lenses and airspaces between respective lenses, reference symbols $n_1$, $n_2$ and $n_3$ respectively represent refractive indices of respective lenses at $\lambda = 632.8$ nm, reference symbols $\nu_1$, $\nu_2$ and $\nu_3$ respectively represent Abbe's numbers of respective lenses for d-line, reference symbol f represents the focal length of the lens system as a whole, reference symbols $f_1$ and $f_3$ respectively represents focal lengths of the first and third lenses, reference symbol N.A. represents the numerical aperture, reference symbol W.D. represents the working distance, and reference symbol $\beta$ represents magnification.

4. A reproducing objective for video disks according to claim 1, in which said reproducing objective for video disks has the following numerical data:

$r_1 = 2.6586$

|  |  |  |
|---|---|---|
| $d_1 = 0.377$ | $n_1 = 1.77861$ | $\nu_1 = 25.7$ |

$r_2 = -2.4267$ $d_2 = 0.129$ $r_3 = -1.0082$

|  |  |  |
|---|---|---|
| $d_3 = 0.274$ | $n_2 = 1.51462$ | $\nu_2 = 64.2$ |

$r_4 = -1.3662$ $d_4 = 0.923$ $r_5 = 0.5442$

|  |  |  |
|---|---|---|
| $d_5 = 0.183$ | $n_3 = 1.77861$ | $\nu_3 = 25.7$ |

$r_6 = 5.2755$ $f = 1 \quad N.A. = 0.4 \quad W.D. = 0.259$
$\beta = -0.05X \quad f_3 = 0.7667 \quad f_1 = 1.683$ wherein reference symbols $r_1$ through $r_6$ respectively represent radii of curvature of respective lens surfaces, reference symbols $d_1$ through $d_5$ respectively represent thicknesses of respective lenses and airspaces between respective lenses, reference symbols $n_1$, $n_2$ and $n_3$ respectively represent refractive indices of respective lenses at $\lambda = 632.8$ nm, reference symbols $\nu_1$, $\nu_2$ and $\nu_3$ respectively represent Abbe's numbers of respective lenses for d-line, reference symbol f represents the focal length of the lens system as a whole, reference symbols $f_1$ and $f_3$ respectively represents focal lengths of the first and third lenses, reference symbol N.A. represents the numerical aperture, reference symbol W.D. represents the working distance, and reference symbol $\beta$ represents magnification.

* * * * *